United States Patent
Nagano et al.

(10) Patent No.: US 7,522,887 B2
(45) Date of Patent: Apr. 21, 2009

(54) WIRELESS SIGNAL SWITCHING CIRCUIT AND WIRELESS COMMUNICATION APPARATUS

(75) Inventors: Hiroaki Nagano, Kanagawa (JP); Akira Suhara, Kanagawa (JP); Kazuhiro Yamada, Aichi (JP); Shigeya Aoyama, Aichi (JP)

(73) Assignees: Sony Corporation (JP); NGK Spark Plug Co., Ltd. (JP)

( * ) Notice: Subject to any disclaimer, the term of this patent is extended or adjusted under 35 U.S.C. 154(b) by 0 days.

(21) Appl. No.: 10/561,610

(22) PCT Filed: Jun. 21, 2004

(86) PCT No.: PCT/JP2004/009055

§ 371 (c)(1),
(2), (4) Date: Feb. 1, 2007

(87) PCT Pub. No.: WO2005/002078

PCT Pub. Date: Jan. 6, 2005

(65) Prior Publication Data

US 2007/0213015 A1    Sep. 13, 2007

(30) Foreign Application Priority Data

Jun. 26, 2003   (JP) .............................. 2003-182565

(51) Int. Cl.
*H04B 1/44* (2006.01)
(52) U.S. Cl. .......................... 455/78; 455/62; 455/63.3; 455/82; 455/83; 455/63.1
(58) Field of Classification Search ................... 455/62, 455/63.3, 78, 82, 83, 63.1
See application file for complete search history.

(56) References Cited

U.S. PATENT DOCUMENTS 5,521,561 A * 5/1996 Yrjola et al. ................ 333/103

(Continued)

FOREIGN PATENT DOCUMENTS

JP            11-355174            12/1999

(Continued)

OTHER PUBLICATIONS

International Search Report dated Oct. 19, 2004.

*Primary Examiner*—Quochien B Vuong
*Assistant Examiner*—Ping Y Hsieh
(74) *Attorney, Agent, or Firm*—Rader Fishman & Grauer PLLC; Ronald P. Kananen

(57) ABSTRACT

A wireless signal switching circuit for switching a plurality of wireless transmitter signals or a plurality of wireless receiver signals with low loss in a dual mode compatible mobile phone (cellular phone) or other mobile wireless communication apparatus having for example a triple band GSM system as a first communication system and for example a UMTS system as a second communication system is provided. A wireless signal switching circuit 1 has a signal route switch 20 of a F2 or F3 transmission and reception system, a signal route switching circuit 30 of an F1 or UMTS transmission and reception system having a diplexer 31, and a 90 degree phase rotation circuit 40. The relationship of frequencies is $F1 \leq F2 < F3$. The 90 degree phase rotation circuit 40 has the characteristic that the phase of a signal of F2 or F3 is rotated by 90 degrees when a switch element 44 is set to a closed state, and a high frequency of UMTS is attenuated when the switch element 44 is set to an opening state.

18 Claims, 4 Drawing Sheets

U.S. PATENT DOCUMENTS

| | | | |
|---|---|---|---|
| 6,298,224 B1* | 10/2001 | Peckham et al. | 455/188.1 |
| 6,466,768 B1* | 10/2002 | Agahi-Kesheh et al. | 455/78 |
| 6,983,129 B2* | 1/2006 | Satoh et al. | 455/82 |
| 7,003,312 B2* | 2/2006 | Kemmochi et al. | 455/552.1 |
| 7,058,364 B2* | 6/2006 | Atkinson et al. | 455/76 |
| 2002/0049075 A1* | 4/2002 | Takagi | 455/553 |
| 2002/0090974 A1* | 7/2002 | Hagn | 455/552 |
| 2003/0189910 A1* | 10/2003 | Yamada et al. | 370/335 |

FOREIGN PATENT DOCUMENTS

| | | |
|---|---|---|
| JP | 2002-208873 | 7/2002 |
| JP | 2003-168996 | 6/2003 |
| JP | 2004-064597 | 2/2004 |

\* cited by examiner

FIG. 3A IN
FIG. 3B OUT
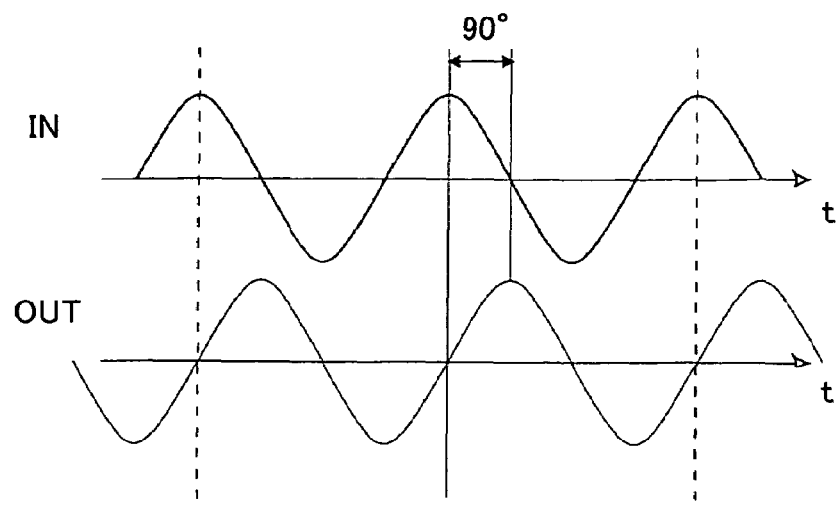
FIG. 4
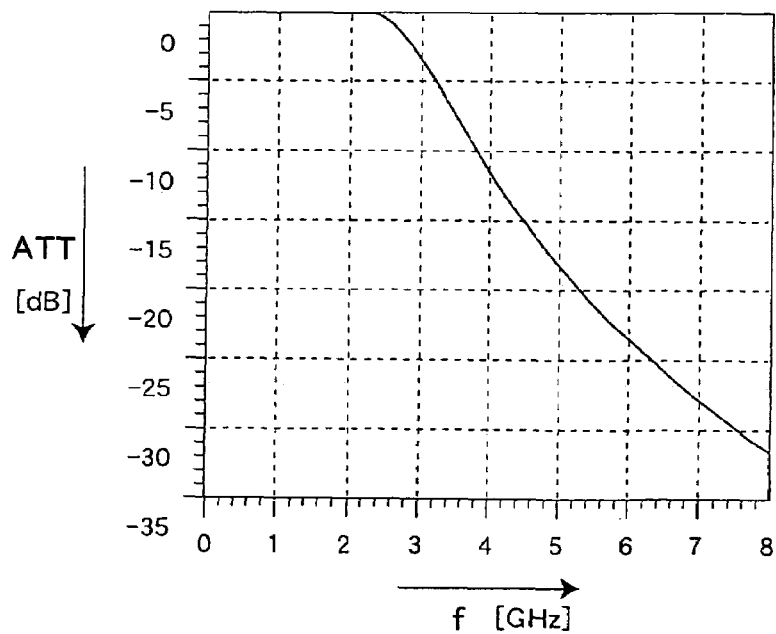

WIRELESS SIGNAL SWITCHING CIRCUIT AND WIRELESS COMMUNICATION APPARATUS

TECHNICAL FIELD

The present invention relates to a wireless signal switching circuit for switching signals when transmitting a plurality of wireless transmitter signals or receiving a plurality of wireless receiver signals by using antennas and a wireless communication apparatus using the same.

The wireless signal switching circuit of the present invention is applied to a multi-band compatible mobile phone (cellular phone) or other mobile wireless communication apparatus etc.

BACKGROUND ART

In recent years, in mobile wireless communication terminals such as mobile phones or PDA's (personal digital assistants), lower power consumption, smaller size, and lighter weight have been realized. Realization of multi-band and multi-mode functions is inevitable. Along with this, such multi-band compatible mobile wireless communication terminals are being provided with wireless signal switching circuits for switching a plurality of wireless transmitter signals or a plurality of wireless receiver signals. In such wireless signal switching circuits, reduction of loss at the time of switching among a plurality of routes and in routes has been strongly demanded.

Referring to the document "Chip Multilayer Antenna Switch Module for Triple Band Phone (EGSM/DCS/PCS)", see HITACHI METALS, URL: http://www.hitachi-metals.co.jp/product/isc2001/asm/shs1090t.pdf, an example of signal switching in a wireless signal switching circuit used in a mobile phone (cellular phone) or other mobile wireless communication terminal will be explained. For example, a case of using three frequencies F1, F2 and F3 as the multi-bands will be explained. However, assume that the frequencies have a relationship of F1<<F2<F3. For example, F1=900 MHz, F2=1800 MHz, and F3=1900 MHz.

In the wireless signal switching circuit illustrated in FIG. 1, a diplexer 102 directly connected to an antenna terminal 101 of a wireless transmitter and receiver antenna ANT roughly divides a frequency domain of the transmitter and receiver signal into two. Namely, the diplexer 102 divides the frequency domain into a frequency F1 having a low frequency and frequencies F2 and F3 having a high frequency.

A switch element 103 separates a transmitter signal F1TX and a receiver signal F1RX of the frequency F1. The transmitter signal F1TX of the frequency F1 is applied to the switch element 103 through a low pass filter 106 and transmitted from the wireless transmitter and receiver antenna ANT through the diplexer 102. The receiver signal F1RX of the frequency F1 received at the wireless transmitter and receiver antenna ANT is divided in frequency at the diplexer 102 and output from the switch element 103.

The switch element 104 separates the transmitter signal F2 or F3TX of the frequency F2 or F3 (F2/F3), and the receiver signal F2RX of the frequency F2 and the receiver signal F3RX of the frequency F3. The transmitter signal F2 or F3TX of the frequency F2 or F3 is applied to the switch element 104 through the low pass filter 107 and transmitted from the wireless transmitter and receiver antenna ANT through the diplexer 102. The receiver signal F2 or F3RX of the frequency F2 or F3 received at the wireless transmitter and receiver antenna ANT is separated at the diplexer 102 and output from the switch element 104. Further, the switch element 105 separates the receiver signal F2RX of the frequency F2 and the receiver signal F3RX of the frequency F3.

The wireless signal switching circuit explained above employs a configuration roughly dividing the frequency domain into two at first by using the diplexer 102, then switching routes of frequencies by using switch elements 103 to 105, therefore requires many switch elements. For example, at the reception side of the frequency F2 or F3, signals pass through the diplexer 102, the switch element 104 and the switch element 105, so the losses at the switch elements accumulate resulting in a larger attenuation of the receiver signal. The attenuation of the receiver signal causes the disadvantages of the necessity of adding a signal amplifier circuit and susceptibility to noise.

In the example explained above, there were three types of frequency, but the larger the type of the frequency to be used, the larger the number of switches for switching the routes accompanied with that. When a PIN (positive intrinsic negative) diode, for example, as such a switch element is used, the power consumption becomes large.

When using such a wireless signal switching circuit in a mobile phone or other wireless communication apparatus, the power consumption of the wireless communication apparatus becomes large. For example, a mobile phone is driven by a battery, therefore the increase of the power consumption causes the disadvantage such as shortening of the service life of the battery.

DISCLOSURE OF THE INVENTION

An object of the present invention is to provide a wireless signal switching circuit for reducing the loss and reducing the power consumption.

Another object of the present invention is to provide a wireless communication apparatus using the wireless signal switching circuit for reducing the loss and reducing the power consumption.

According to a first aspect of the present invention, there is provided a wireless signal switching circuit for switching a plurality of transmitter signals and receiver signals having different frequencies in wireless communication for communication by at least a first communication system and a second communication system, including an antenna terminal connected to an antenna; a first signal route switching means having a plurality of switch means for selecting a plurality of transmitter signals and receiver signals having different frequencies in the first communication system; a phase rotating means having one end connected to the antenna terminal and imparting a phase rotation of 90 degrees to the phase of the signal of the frequency component supplied to the first signal route switching means; and a second signal route switching means having a diplexer for separating the transmitter signals and receiver signals having a further different frequency of the first communication system lower than the plurality of frequencies in the first communication system explained above and the transmitter and receiver signals of the second communication system, a common input and output terminal of the diplexer being connected to the other end of the phase rotating means, a first filter side terminal of the diplexer being supplied with transmitter and receiver signals having a further different frequency of the first communication system, and a second filter side terminal of the diplexer being supplied with transmitter and receiver signals of the second communication system.

Preferably, the phase rotating means has a characteristic of attenuating harmonic components of signals transmitted by the second communication system.

Further preferably, the first filter side of the diplexer is a low frequency filter side, and the second filter side of the diplexer is a high frequency filter side.

Preferably, the phase rotating means is provided with an inductor having one end connected to the antenna terminal and having the other end connected to the common input and output terminal of the diplexer, a first capacitor connected between one end of the inductor and a reference potential node, a second capacitor connected between the other end of the inductor and the reference potential node, a first switch means having one end connected to the other end of the inductor, and a third capacitor connected between the other end of the first switch means and the reference potential node, and has the characteristics that a circuit defined by the inductor and the first to third capacitors imparts a phase rotation of 90 degrees to the phase of the signal of the frequency component supplied to the first signal route switching means when the first switch means is activated and that a circuit defined by the inductor and the first and second capacitors attenuates the harmonic component of the signal transmitted by the second communication system when the first switch means is de-activated.

For example, the first communication system is a triple band GSM system, and the second communication system is a UMTS system.

Preferably, the first signal route switching means is provided with a first receiver signal switching circuit connected to the antenna terminal and having a plurality of switch means for selecting receiver signals having a plurality of different frequencies in the first communication system and a first transmitter signal switching circuit connected to the antenna terminal and having a switch means for selecting transmitter signals having a plurality of different frequencies in the first communication system and a filter means connected to the switch means.

More preferably, the second signal route switching means has a switch means connected to the first filter side terminal of the diplexer and selecting a transmitter signal having a further different frequency of the first communication system and a switch means for selecting a receiver signal having a further different frequency of the first communication system.

According to a second aspect of the present invention, there is provided a wireless communication apparatus provided with a wireless transmitter and receiver antenna and a wireless signal switching circuit.

Preferably, the wireless communication apparatus is a mobile wireless communication apparatus including a dual mode compatible mobile phone of a triple band GSM system as the first communication system and a UMTS system as the second communication system.

More preferably, the second filter side terminal of the diplexer is connected to a front end of a UMTS use transmission and reception circuit, and the front end has a duplexer for switching the UMTS transmitter signal and UMTS receiver signal, a low noise amplifier circuit for amplifying the UMTS receiver signal input through this duplexer, and a power amplifier circuit for amplifying the UMTS transmitter signal.

These and other objects and features of the present invention of the present invention will become clearer from the following description given with reference to the accompanying drawings.

BRIEF DESCRIPTION OF THE DRAWINGS

FIGS. 3A and 3B are waveform diagrams of an input signal and output signal of a 90 degree phase rotation circuit in the wireless signal switching circuit illustrated in FIG. 2.

FIG. 4 is a diagram showing an attenuation characteristic of the 90 degree phase rotation circuit in the wireless signal switching circuit illustrated in FIG. 2.

BEST MODE FOR CARRYING OUT THE INVENTION

Below, a detailed explanation will be given of preferred embodiments of the wireless signal switching circuit and the wireless communication apparatus of the present invention with reference to the drawings.

FIRST EMBODIMENT

Figure 2:
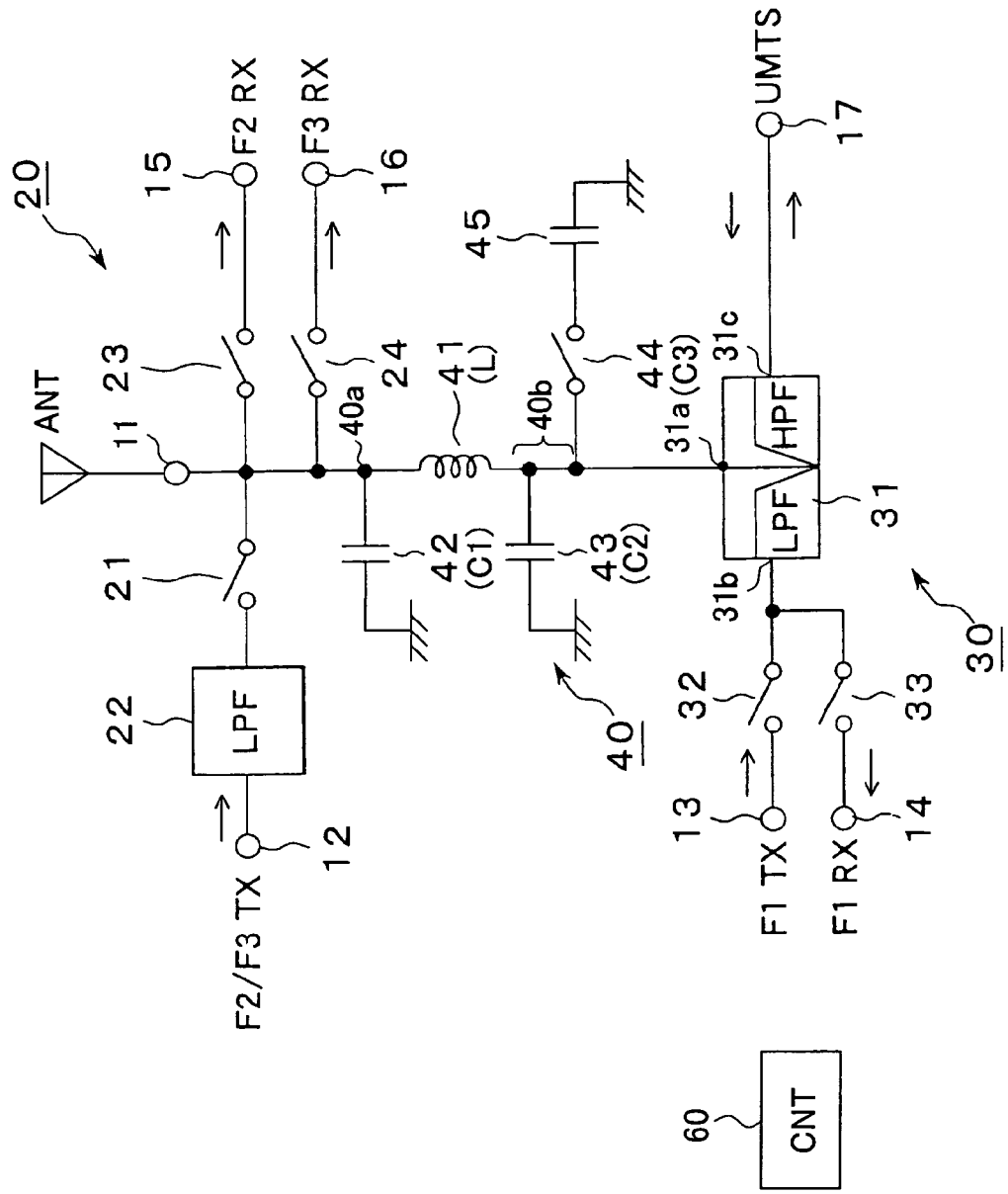
FIG. 2 is a circuit diagram of a wireless signal switching circuit of an embodiment of the wireless signal switching circuit of the present invention.

FIG. 2 is a circuit diagram of an example of the configuration of a wireless signal switching circuit as an embodiment of the wireless signal switching circuit of the present invention.

In the present embodiment, a dual mode compatible mobile phone (cellular phone) having for example a triple band GSM (global system for mobile communication system) system as the first communication system and for example a UMTS (universal mobile telecommunications system) system as the second communication system is exemplified.

Further, a TDMA (time division multiple access) operation using three frequencies F1, F2 and F3, i.e., three frequencies having a relationship of F1<<F2<F3, as the multi-bands of the GSM system is carried out. In the dual mode in the UMTS system, a GSM and UMTS dual mode performing a FDD (frequency division duplex) operation is exemplified.

As an example, F1=900 MHz, F2=1800 MHz and F3=1900 MHz are set. Further, in the UMTS system, the transmission and reception are simultaneously carried out. As an example, the transmission frequency is set to 1950 MHz, and the reception frequency is set to 2150 MHz.

The wireless signal switching circuit 1 illustrated in FIG. 2 has an antenna terminal 11 connected to the wireless transmitter and receiver antenna ANT, a transmission terminal 12 connected to each transmission system (TX) of frequency F2 or F3, a transmission terminal 13 connected to the transmission system (TX) of the frequency F1, a reception terminal 14 connected to the reception system (RX) of the frequency F1, reception terminals 15 and 16 connected to reception systems of frequencies F2 and F3, and a transmission and reception terminal 17 connected to the UMTS transmission and reception system. Further, the wireless signal switching circuit 1 is provided with, provided between these terminals, a signal route switch 20 of an F2 or F3 transmission and reception system, a signal route switching circuit 30 of an F1/UMTS transmission and reception system, and a 90 degree phase rotation circuit 40.

Especially, the 90 degree phase rotation circuit 40 is provided between the signal route switch 20 of the F2 or F3 transmission and reception system and the signal route switching circuit 30 of the F1/UMTS transmission and reception system.

The wireless signal switching circuit 1 is further provided with a controlling means 60 for controlling opening/closing of switch elements in the signal route switch 20 of the F2/F3 transmission and reception system, the signal route switching circuit 30 of the F1/UMTS transmission and reception system, and the 90 degree phase rotation circuit 40.

In the present Description, "/" means "or". For example, F2/F3 means F2 or F3. On the other hand, "." means "and". For example, F1/UMTS means F1 and UMTS.

The route switching circuit 20 of the F2 or F3 transmission and reception system of an example of the first signal route switching means of the present invention has a switch element 21 connected in series between the antenna terminal 11 and the transmission terminal 12 for the F2 or F3 transmitter signal F2 or F3TX and a harmonic suppressor filter, for example, a low pass filter (LPF) 22. Further, the signal route switch 20 of the F2 or F3 transmission and reception system has a switch element 23 connected between the antenna terminal 11 and the reception terminal 15 in order to select and extract the receiver signal F2RX of the frequency F2. Further, the signal route switch 20 of the F2 or F3 transmission and reception system has a switch element 24 connected between the antenna terminal 11 and the reception terminal 16 in order to select and extract the receiver signal F3RX of the frequency F3.

The signal route switching circuit 30 of the F1 and UMTS transmission and reception system of an example of the second signal route switching means of the present invention has a diplexer 31 comprised of a combination of pass filters of bands corresponding to the multi-mode frequencies, i.e., the low pass filter (LPF) and high pass filter (HPF) in the present example, and having the HPF side terminal connected to the UMTS transmission and reception terminal 17, a switch element 32 connected between the LPF side terminal of this diplexer 31 and the F1 transmitter signal (F1TX) use terminal 13, and a switch element 33 connected between the LPF side terminal of the diplexer 31 and the F1 receiver signal (F1RX) use terminal 14. In the signal route switching circuit 30 of the F1 and UMTS transmission and reception system, the HPF side terminal of the diplexer 31 is connected to the UMTS transmission and reception terminal 17.

The 90 degree phase rotation circuit 40 has an inductor 41 having one end 40a connected to the antenna terminal 11 and having the other end 40b connected to an input and output terminal 31a of the diplexer 31, a capacitor 42 connected between one end side 40a of the inductor 41 and the ground as the reference potential node, a capacitor 43 connected between the other end 40b of the inductor 41 and the ground, and a switch element 44 and capacitor 45 connected in series between the other end 40b of the inductor 41 and the ground.

In the 90 degree phase rotation circuit 40, the inductor 41, capacitor 42 and the capacitor 43 are always connected, but the capacitor 45 is connected or disconnected to the inductor 41, the capacitor 42 and the capacitor 43 in accordance with the opening/closing of the switch element 44 on the basis of the controlling means 60.

The 90 degree phase rotation circuit 40 has a characteristic passing the transmitter signal or receiver signal having the frequency F1 or the UMTS transmitter and receiver signal therethrough, while rotating the phase by 90 degrees and isolating the transmitter signal or the receiver signal having the frequency F2 or F3 so that the signal of the frequency F2 or F3 is substantially not applied to the signal route switching circuit 30 of the F1 and UMTS transmission and reception system.

For this reason, in the 90 degree phase rotation circuit 40, an inductance L of the inductor 41 and capacitances C1 and C2 of the capacitors 42 and 43 rotate the phases of signals of frequencies F2 and F3 by 90 degrees. Preferably, the 90 degree phase rotation circuit 40 is set to a value so that it further has the characteristics of a low pass filter (LPF) exhibiting an attenuation characteristic with respect to the harmonic components (frequency components 2 times or 3 times the transmission frequency) of the transmission frequency used in the UMTS route from the UMTS transmission and reception terminal 17 as illustrated in FIG. 4.

FIG. 3A and FIG. 3B show the input and output characteristics of the 90 degree phase rotation circuit 40. When the sine wave input signal illustrated in FIG. 3A is applied to the 90 degree phase rotation circuit 40, the output thereof becomes an output signal with a phase delay of 90 degrees illustrated in FIG. 3B. In FIG. 3A and FIG. 3B, the abscissas show the time.

FIG. 4 shows an example of the attenuation characteristic of the 90 degree phase rotation circuit 40. In the present example, F1=900 MHz, F2=1800 MHz, and F3=1900 MHz. Further, the transmission frequency of the UMTS system is set to 1950 MHz, and the reception frequency is set to 2150 MHz.

The attenuation characteristic illustrated in FIG. 4 is set to a value that also has the characteristic of a low pass filter (LPF) exhibiting an attenuation characteristic of almost no attenuation at F1=900 MHz, but large attenuation with respect to the harmonic components (frequency components 2 times or 3 times the transmission frequency 1950 MHz) of the transmission frequency used in the UMTS route from the UMTS transmission and reception terminal 17.

The switch element 44 is driven by the controlling means 60 so as to open or close in synchronization with the opening or closing operation of the switch element 21 which becomes "closed" in order to apply the F2 or F3 transmitter signal F2 or F3TX to the antenna terminal 11 and the switch element 23 for selecting the F2 receiver signal F2RX or the switch element 24 for selecting the F3 receiver signal F3RX.

As the switch elements 21, 23 and 24 in the signal route switch 20 of the F2 or F3 transmission and reception system, the switch elements 32 and 33 in the signal route switching circuit 30 of the F1 or UMTS transmission and reception system, and the switch elements 42, 43 and 44 in the 90 degree phase rotation circuit 40, use can be made of semiconductor switches such as field effect transistors (FET) or PIN diodes. These switch elements are preferably elements having good high frequency characteristics, that is, able to perform high speed operation, and having little leakage current.

These switch elements are opened or closed in accordance with a control instruction of the controlling means 60. In the present Description, for example, the switch element 21 and the controlling means 60 are together referred to as the "switch means".

In the present Description, for example, setting the switch element 21 to the closed state (or on state) is referred to as the "activated state", while setting the switch element 21 to the opening state (or off state) is referred to as the "de-activated state".

The operation of the wireless signal switching circuit 1 having the above configuration will be explained next.

(1) Time when transmitting transmitter signal F2 or F3TX using frequency F2 or F3

The controlling means 60 sets the switch element 21 to the closed (on) state and sets the switch element 23 and 24 to the opening (off) state, then sets the switch element 44 to the closed state. Naturally, the controlling means 60 set the switch element 32 and the switch element 33 to the opening state.

In this state, the transmitter signal F2 or F3TX applied to the transmission terminal 12 passes through the LPF 22 and the switch element 21, is applied to the antenna terminal 11, and is transmitted from the wireless transmitter and receiver antenna ANT.

When the controlling means 60 sets the switch element 44 to the closed state, the circuit configured by the inductor 41 and the capacitors 42, 43 and 45 exhibits a characteristic rotating the phase by 90 degrees and grounding the signal having the frequency F2 or F3 and becomes a high impedance with respect to the frequency component. As a result, isolation between the route side of the F2 or F3 transmission and reception system of F2 or F3TX and F2 or F3RX and the route side of the F1 or UMTS transmission and reception system can be secured. Due to this, the influence of the route side of the F1 or UMTS transmission and reception system upon the route side of the F2 or F3 transmission and reception system can be reduced and, at the same time, the loss of the transmission route at the frequency F2 or F3 can be made small.

(2) Time when receiving receiver signal F2 or F3RX using frequency F2 or F3

The controlling means 60 sets the switch element 21 to the opening (off) state, sets the switch element 23 or the switch element 24 to the closed (on) state, then sets the switch element 44 to the closed state. Naturally, the controlling means 60 holds the switch element 32 and the switch element 33 in the opening state.

In this state, among the receiver signals F2 or F3RX applied to the antenna terminal 11 from the wireless transmitter and receiver antenna ANT, the F2 receiver signal F2RX is output from the terminal 15 when the switch element 23 is in the closed state, and the F3 receiver signal F3RX is output from the terminal 16 when the switch element 24 is in the closed state.

The mode of operation of the 90 degree phase rotation circuit 40 when the switch element 44 is set to the closed state is the same as the above description. Namely, it exhibits the characteristic that the circuit configured by the inductor 41 and the capacitors 42, 43 and 45 rotates the phase of the signal having the frequency F2 or F3 by 90 degrees and is grounded and becomes a high impedance with respect to the frequency component. As a result, isolation between the route side of the reception system of F2 or F3RX and the route side of the F1 or UMTS transmission and reception system can be secured. By this, the influence of the route side of the F1 or UMTS transmission and reception system upon the route side of the F2 or F3 reception system can be reduced and, at the same time, the loss of the transmission route at the frequency F2 or F3 can be made small.

(3) Time when transmitting transmitter signal F1TX using frequency F1

The controlling means 60 sets the switch element 32 to the closed (on) state and sets the switch element 33 and switch element 44 to the opening (off) state. Naturally, it holds the switch element 21 and the switch elements 23 and 24 in the opening state.

The F1 transmitter signal F1TX applied to the F1 transmitter signal use terminal 13 passes through the switch element 32, is input to the diplexer 31 from the LPF side terminal 31b of the diplexer 31, passes through the LPF in the diplexer 31, passes through the 90 degree phase rotation circuit 40, is applied to the antenna terminal 11, and is transmitted from the wireless transmitter and receiver antenna ANT.

At this time, the 90 degree phase rotation circuit 40 functions as an LPF for attenuating the harmonic components of the UMTS transmission frequency according to the attenuation characteristic exemplified in FIG. 4 and preventing it from passing, but becomes the pass band with respect to the transmission frequency F1 (for example 900 MHz). Accordingly, the loss in this transmission route mainly becomes the loss in the diplexer 31. The loss of the diplexer 31 is extremely small, therefore it is possible to reduce the loss of the transmission route at the frequency F1.

(4) Time when receiving receiver signal F1RX using frequency F1

The controlling means 60 sets the switch element 33 to the closed (on) state and sets the switch element 32 and the switch element 44 to the opening (off) state. Naturally, it holds the switch element 21 and the switch elements 23 and 24 in the opening state.

The receiver signal F1RX using the frequency F1 is input from the terminal 11 of the wireless transmitter and receiver antenna ANT, passes through the 90 degree phase rotation circuit 40, is separated to the LPF side in the diplexer 31, and is output to the reception terminal 14 through the switch element 33 in the closed (on) state.

At this time as well, the 90 degree phase rotation circuit 40 becomes the pass band with respect to the receiver signal having the frequency F1. The loss in this reception route becomes loss in the diplexer 31, therefore the loss of the reception route at the frequency F1 can be reduced.

(5) Transmission of UMTS transmitter signal

The controlling means 60 sets all switch elements of the switch element 21, the switch elements 23 and 24, the switch element 44, and the switch elements 32 and 33 to the opening (off) state.

The UMTS transmitter signal is input from the transmission and reception terminal 17, further input from the HPF side terminal 31c of the diplexer 31, passes through the HPF in the diplexer 31, then passes through the 90 degree phase rotation circuit 40, is applied to the antenna terminal 11, and is transmitted from the wireless transmitter and receiver antenna ANT.

The 90 degree phase rotation circuit 40 becomes the pass band with respect to the UMTS transmission frequency and becomes the attenuation band with respect to the harmonics (frequencies 2 times or 3 times the UMTS frequency) as illustrated in FIG. 4, thus can suppress the harmonic components. The loss in this transmission route mainly becomes the loss in the diplexer 31. Since the loss of the diplexer 31 is extremely small, the loss of the transmission route at the UMTS transmission frequency can be reduced.

(6) Reception of UMTS receiver signal

The controlling means 60 sets all switch elements of the switch element 21, the switch elements 23 and 24, the switch element 44, and the switch elements 32 and 33 to the opening (off) state.

The UMTS receiver signal received at the wireless transmitter and receiver antenna ANT is applied to the antenna terminal 11, passes through the 90 degree phase rotation circuit 40, then is separated to the HPF side 31c by the diplexer 31, and output through the transmission and reception terminal 17.

The 90 degree phase rotation circuit 40 becomes the pass band with respect to the UMTS receiver signal. The loss in this reception route mainly becomes the loss in the diplexer 31, therefore the loss of the reception route at the UMTS reception frequency can be reduced.

As explained above, in the case of dual mode compatibility of the triple band GSM system and the UMTS system, at the time of signal route switching by the signal route switch 20 of the F2 or F3 transmission and reception system, by preventing the frequency component on the signal route switch 20 side of the F2 or F3 transmission and reception system from being supplied to the signal route switching circuit 30 side of the F1 or UMTS transmission and reception system by the function of the 90 degree phase rotation circuit 40, isolation between the route side of the F2 or F3 transmission and reception system and the route side of the F1 or UMTS transmission and reception system is secured and mutual influence can be reduced, therefore the loss at the time of the switching of the triple band and dual mode is reduced, thus the circuit can be accomplished with a low power consumption and small size circuit configuration.

Further, by imparting an attenuation characteristic with respect to the harmonic components of the UMTS frequency to the 90 degree phase rotation circuit 40 as illustrated in FIG. 4, the harmonic components of the UMTS frequency can be attenuated in the 90 degree phase rotation circuit 40. As a result, in the UMTS use transmission and reception circuit explained later by referring to FIG. 5, when assuming that the passing loss at the duplexer (band switching unit) for switching the transmitter signal and the receiver signal is the same as that when an attenuation characteristic is not imparted to the 90 degree phase rotation circuit 40, the configuration of the duplexer can be simplified by exactly the amount able to attenuate the harmonic components of the UMTS frequency. Conversely, when assuming that the configuration of the duplexer is the same as that when the attenuation characteristic is not imparted to the 90 degree phase rotation circuit 40, the passing loss with respect to the UMTS frequency can be reduced by exactly the amount able to attenuate the harmonic components.

In a mobile communication terminal such as a mobile phone (cellular phone) or PDA, there is a strong need for a smaller and lower power consumption in a multi-band, for example, composite terminal mounting a plurality of devices such as a mobile phone and digital camera. Especially, in the wireless signal switching circuit, as explained above, assuming use of one transmitter and receiver antenna, it is necessary to realize a multi-route switching circuit for switching multi-bands with a low loss, low power consumption, and small size. Contrary to this, in the wireless signal switching circuit 1 according to the present embodiment explained by referring to FIG. 2, isolation between the route side of the F2 or F3 transmission and reception system and the route side of the F1 or UMTS transmission and reception system is secured by using the 90 degree phase rotation circuit 40. Low loss in each route can be realized in each route by using not only the switch elements 21 to 24, 32 and 33, but also the diplexer 31 in order to separate the multi-routes. Accordingly, according to the present embodiment, a multi-route switching circuit for switching multi-bands is realized with a low loss, low power consumption, and small scale circuit configuration.

Figure 1:
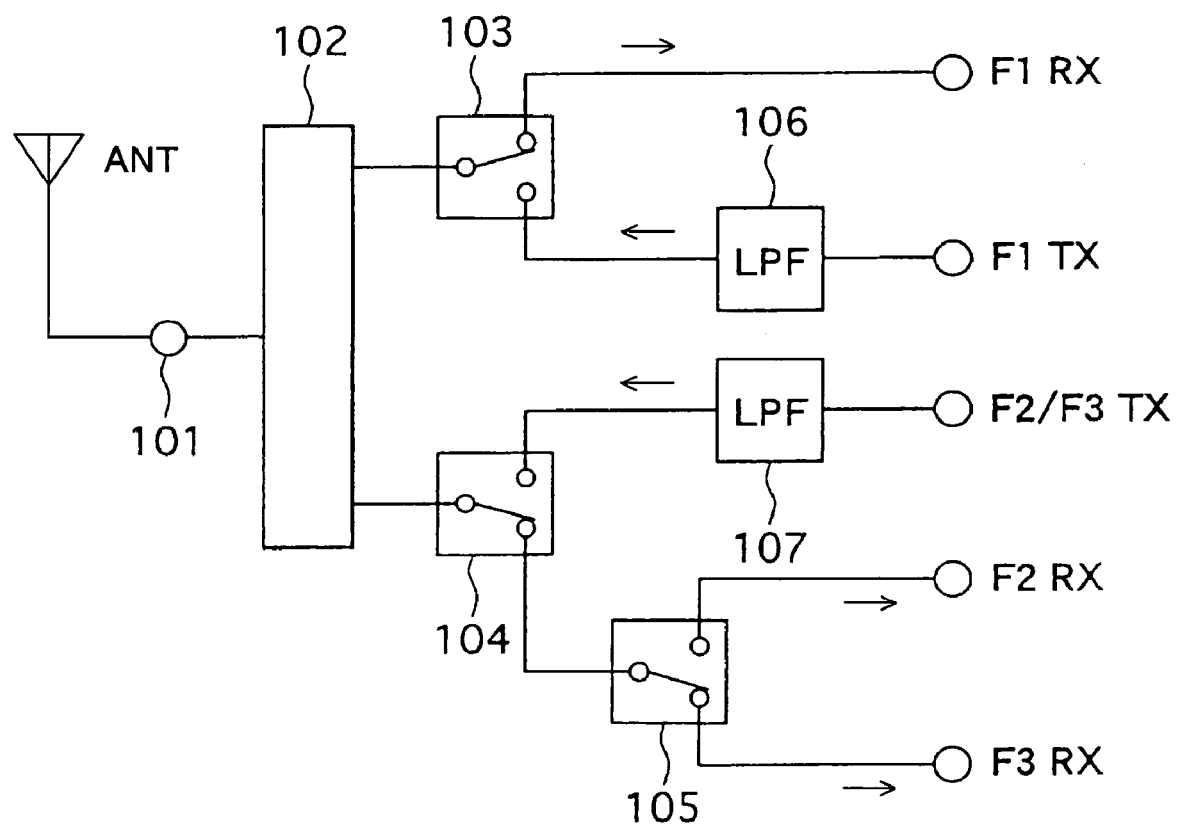
FIG. 1 is a circuit diagram of a conventional wireless signal switching circuit.

As explained by referring to FIG. 1, when employing a configuration separating routes by inserting a plurality of switch elements in series in certain signal routes, losses in the switch elements accumulate and become a large loss. Further, when employing a configuration switching multi-routes by only switch elements, when for example integrating a plurality of mutually connected switch elements, for example, field effect transistors FET (formed them into an IC), due to the parasitic capacitances in the plurality of switch elements connected to each other, there is a possibility that the loss will increase by particularly the increase of switch elements in the off state (opening state). Contrary to this, in the wireless signal switching circuit 1 according to the present embodiment, by employing a configuration separating routes by using the 90 degree phase rotation circuit 40 and the diplexer 31, the number of switch elements inserted on the middle of the routes can be reduced and, at the same time, the number of switch elements connected to each other can be reduced, consequently the detrimental influence due to the parasitic capacitances in the switch elements can be reduced and multiple routes can be separated with a low loss.

When realizing the wireless signal switching circuit of the present invention, the circuit configuration is not limited to the circuit configuration of the 90 degree phase rotation circuit 40 exemplified in FIG. 2. In the wireless signal switching circuit 1 of the present embodiment, values of the components of the 90 degree phase rotation circuit 40, that is the inductance L1 of the inductor 41 and the capacitances C1 to C3 of the capacitors 42, 43 and 45, were set so that the 90 degree phase rotation circuit 40 rotates the phase of the frequencies F2 and F3 by 90 degrees and functions as an LPF with respect to the UMTS route frequency. In place of this, the components of the 90 degree phase rotation circuit 40 (any number of used capacitors and inductors and circuit configuration) may be adjusted so that the 90 degree phase rotation circuit 40 becomes an LPF with respect to the frequency F1 used in the LPF side route of the diplexer 31. In this case, it must also be the pass band with respect to the UMTS frequency.

It is also possible to make the 90 degree phase rotation circuit 40 function as not only an LPF of the diplexer 31, but also as a filter widely.

In the present embodiment, the case of using two communication systems of the GSM system and the UMTS system as different communication systems was explained as an example, but communication systems other than these communication systems may also be used. It is also possible to apply the present invention to the case where three or more different communication systems are used in the same way as above.

The wireless signal switching circuit according to the present embodiment explained above is preferably used for switching a plurality of routes for a plurality of transmitter and receiver signals having different frequencies in a multi-mode compatible mobile wireless communication apparatus such as a mobile phone or PDA.

SECOND EMBODIMENT

Figure 5:
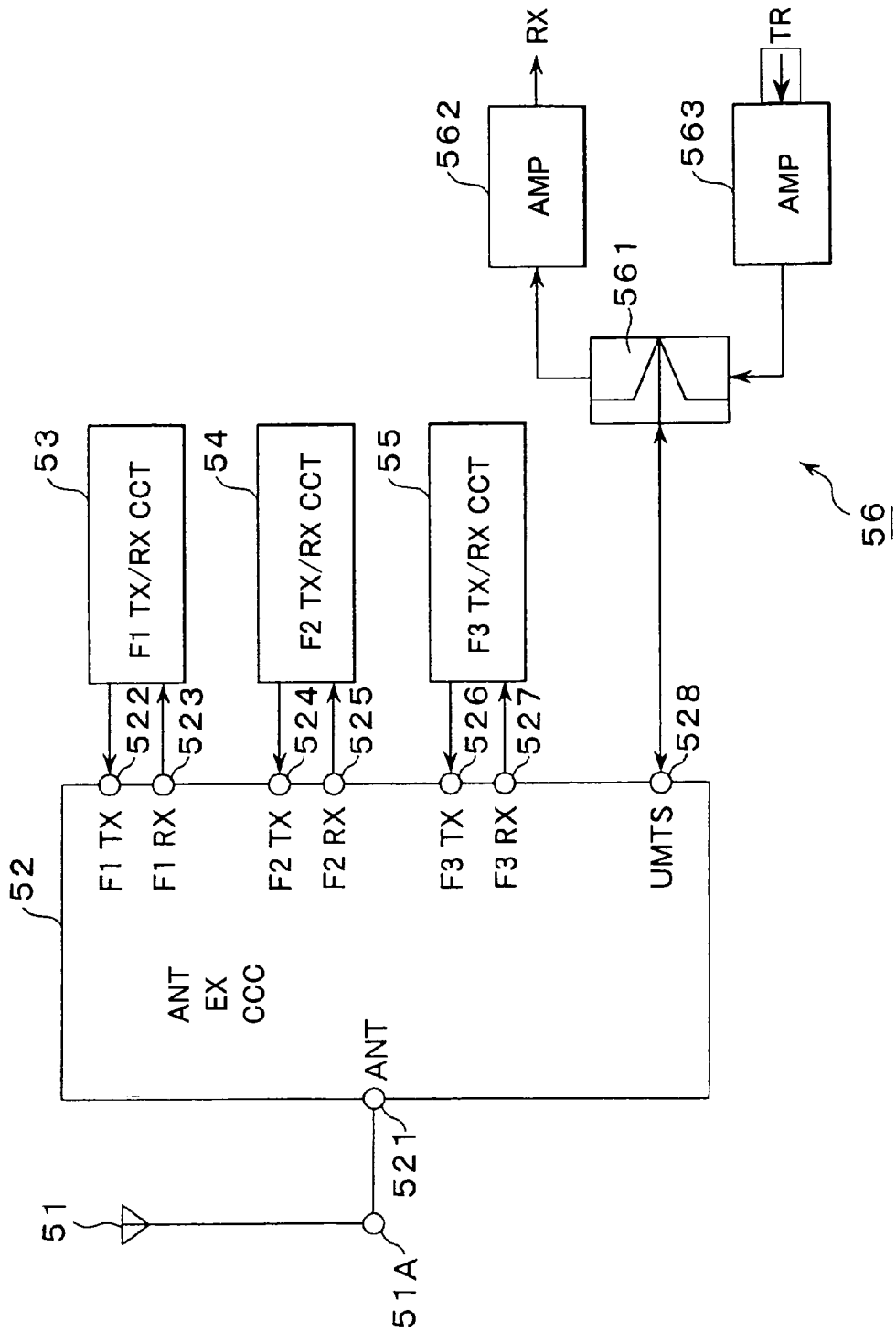
FIG. 5 is a partial diagram of a dual mode compatible mobile phone using the wireless signal switching circuit illustrated in FIG. 2 as an embodiment of the wireless communication apparatus of the present invention.

FIG. 5 is a block diagram of an example of the partial configuration of a mobile wireless communication apparatus using the wireless signal switching circuit of the present invention, for example, a dual mode compatible mobile phone of the triple band GSM system and the UMTS system, as an example of the wireless communication apparatus of the present invention.

As clear from the illustration of FIG. 5, the dual mode compatible mobile phone according to the second embodiment is configured provided with an antenna 51, a wireless signal switching circuit 52, transmission and reception circuits 53, 54 and 55 provided corresponding to the frequencies F1, F2 and F3 of the GSM system, and a transmission and reception circuit 56 of the UMTS system.

The wireless signal switching circuit 52 is provided with an antenna terminal 521 connected to an antenna end 51A of the antenna 51, a reception terminal 522 of the receiver signal having the frequency F1 and a transmission terminal 523 of the transmitter signal having the frequency F1, a reception terminal 524 of the receiver signal having the frequency F2 and a transmission terminal 525 of the transmitter signal having the frequency F2, a reception terminal 526 of the receiver signal having the frequency F3 and a transmission terminal 527 of the transmitter signal having the frequency F3, and a UMTS transmission and reception terminal 528.

The front end of the UMTS transmission and reception circuit 56 is configured provided with a duplexer (band switching unit) 561 for switching the transmitter signal and the receiver signal, a low noise amplifier circuit 562 for amplifying the receiver signal input through this duplexer 561, and a power amplifier circuit 563 for amplifying the transmitter signal.

As the wireless signal switching circuit 52, use is made of the wireless signal switching circuit 1 explained above with reference to FIG. 2.

In the circuit configuration, in the correspondence with FIG. 2, the transmission terminal 13 of FIG. 2 corresponds to the transmission terminal 522, the reception terminal 14 corresponds to the reception terminal 523, the transmission terminal 12 corresponds to the transmission terminal 524 and the transmission terminal 526, the reception terminal 15 corresponds to the reception terminal 525, the reception terminal 16 corresponds to the reception terminal 527, and the transmission and reception terminal 17 corresponds to the transmission and reception terminal 528.

The transmission and reception circuit 53 for the frequency F1 is connected to the transmission terminal 522 and the reception terminal 523, the transmission and reception circuit 54 for the frequency F2 is connected to the transmission terminal 524 and the reception terminal 525, and the transmission and reception circuit 55 for the frequency F3 is connected to the transmission terminal 526 and the reception terminal 527. Further, the UMTS transmission and reception circuit 56 is connected to the transmission and reception terminal 528.

As previously explained, the wireless signal switching circuit 1 explained with reference to FIG. 2 can realize the switching of the triple band and the dual mode with a low loss, low power consumption, and small scale circuit configuration. Accordingly, the use of the wireless signal switching circuit 1 in the mobile phone partially illustrated in FIG. 5 can greatly contribute to the lower power consumption, smaller size, and lighter weight of the mobile phone.

Especially, the 90 degree phase rotation circuit 40 illustrated in FIG. 2 has an attenuation characteristic with respect to the harmonic components of the UMTS frequency and can attenuate the harmonic components of the UMTS frequency. For this reason, in the UMTS transmission and reception circuit 56, when assuming that the passing loss at the duplexer 561 is the same as that when the attenuation characteristic is not imparted to the 90 degree phase rotation circuit 40, the configuration of the duplexer 561 can be simplified by exactly the amount able to attenuate the harmonic components of the UMTS frequency. Conversely, when assuming that the configuration of the duplexer 561 is the same as that when the attenuation characteristic is not imparted to the 90 degree phase rotation circuit 40, the passing loss with respect to the UMTS frequency can be reduced by exactly the amount able to attenuate the harmonic components.

As explained above, according to the wireless signal switching circuit of the present invention, the route switching is carried out by using not only switch elements, but also a diplexer while securing isolation between the transmission route and the reception route by using a 90 degree phase rotating means, therefore a multi-route switching circuit for switching multi-bands can be realized by a low loss, low power consumption, and small scale circuit configuration.

Further, according to the present invention, by using such a wireless signal switching circuit in a wireless communication apparatus, the wireless communication apparatus can be configured low in power consumption, small in size, and light in weight.

Further, according to the present invention, by imparting an attenuation characteristic with respect to the harmonic components of the UMTS frequency by a 90 degree phase rotating means, the harmonic components of the UMTS frequency can be attenuated. For this reason, the passing loss with respect to the frequency of UMTS can be reduced.

The present invention is not limited to the above illustration. Various modifications can be employed based on the technical idea of the present invention. Accordingly, the present invention covers the invention disclosed in the claims and a scope equivalent to the invention.

LIST OF REFERENCES

1 . . . wireless signal switching circuit
   11 . . . antenna terminal
   12 . . . transmission terminal
   13 . . . F1 transmitter signal terminal
   14 . . . F1 receiver signal terminal
   15 . . . F2 receiver signal terminal
   16 . . . F3 receiver signal terminal
   17 . . . UMTS transmission and reception terminal
20 . . . F2 or F3 transmission and reception system signal route switching
   21 . . . switch element
   22 . . . LPF
   23, 24 . . . switch element
30 . . . F1 or UMTS transmission and reception system signal route switching circuit
   31 . . . diplexer
   32, 33 . . . switch element
40 . . . 90 degree phase rotation circuit
   41 . . . inductor
   42, 43 . . . capacitor
   44 . . . switch element
   45 . . . capacitor

The invention claimed is:

1. A wireless signal switching circuit for switching a plurality of transmitter and receiver signals having different frequencies in wireless communication for communication by at least a first communication system and a second communication system, comprising:

an antenna terminal (11) connected to an antenna (ANT);

a first signal route switching means (20) having a plurality of switch means (21, 23, 24, 60) for selecting a plurality of transmitter and receiver signals having different frequencies in the first communication system, the different frequencies including at least a second frequency and a third frequency (F2, F3);

a phase rotating means (40) having one end (40a) connected to the antenna terminal (11) and imparting a phase rotation of 90 degrees to the phase of the signal of the frequency component supplied to the first signal route switching means (20); and a second signal route switching means (30) having a diplexer (31) for separating the transmitter and receiver signals having a first frequency (F1) of the second communication system lower than the first and second frequencies (F2, F3) of the first communication system and the transmitter and receiver signals of the first communication system, a common input and output terminal (31a) of the diplexer (31) being connected to the other end (40b) of the phase rotating means, a first filter side terminal (31b) of the diplexer (31) being supplied with transmitter and receiver signals having the first frequency (F1) of the second communication system, and a second filter side terminal (31c) of the diplexer (31) being supplied with transmitter and receiver signals of the second communication system, and an inductor (41) being connected between the one end (40a) connected to the antenna terminal (11) and the other end (40b) connected to the diplexer (31) in the second routing means (30), and wherein the phase rotating means comprises:
the inductor (41) having the other end (40b) connected to the common input and output terminal (31a) of the diplexer (31),
a first capacitor (42) connected between one end of the inductor (41) and a reference potential node,
a second capacitor (43) connected between the other end of the inductor and the reference potential node,
a first switch means (44, 60) having one end connected to the other end of the inductor (41), and
a third capacitor (45) connected between the other end of the first switch means (44, 60) and the reference potential node, and
has the characteristics
that a circuit defined by the inductor (41) and the first to third capacitors (42, 43, 45) imparts a phase rotation of 90 degrees to the phase of the signal of the frequency component supplied to the first signal route switching means (20) when the first switch means is activated and
that a circuit defined by the inductor (41) and the first and second capacitors (42, 43) attenuates the harmonic component of the signal transmitted by the second communication system when the first switch means is de-activated.

2. A wireless signal switching circuit as set forth in claim 1, wherein
the phase rotating means has a characteristic of attenuating harmonic components of signals transmitted by the second communication system.

3. A wireless signal switching circuit as set forth in claim 1, wherein
the first filter side of the diplexer (31) is a low frequency filter side, and the second filter side of the diplexer (31) is a high frequency filter side.

4. A wireless signal switching circuit as set forth in claim 1, wherein
the first communication system is a triple band GSM system, and
the second communication system is a UMTS system.

5. A wireless signal switching circuit as set forth in claim 4, wherein the first signal route switching means (20) comprises:
a first receiver signal switching circuit connected to the antenna terminal (11) and having a plurality of switch means (23, 24) for selecting receiver signals (F2RX or F3RX) having a the different frequencies including at least the second frequency and the third frequency (F2, F3) in the first communication system and
a first transmitter signal switching circuit connected to the antenna terminal (11) and having a switch means (22) for selecting transmitter signals (F2 or F3TX) having the different frequencies including at least the second frequency and the third frequency (F2, F3) in the first communication system and a filter means connected to the switch means.

6. A wireless signal switching circuit as set forth in claim 5, wherein the second signal route switching means (30) has a switch means (32) connected to the first filter side terminal (31b) of the diplexer (31) and selecting a transmitter signal having a further different frequency (F1) of the first communication system and a switch means (33) for selecting a receiver signal having the first frequency (F1) of the second communication system.

7. A wireless signal switching circuit as set forth in claim 4, wherein the second signal route switching means (30) has a switch means (32) connected to the first filter side terminal (31b) of the diplexer (31) and selecting a transmitter signal having a further different frequency (F1) of the first communication system and a switch means (33) for selecting a receiver signal having the first frequency (F1) of the second communication system.

8. A wireless signal switching circuit as set forth in claim 1, wherein the second signal route switching means (30) has a switch means (32) connected to the first filter side terminal (31b) of the diplexer (31) and selecting a transmitter signal having a further different frequency (F1) of the first communication system and a switch means (33) for selecting a receiver signal having the first frequency (F1) of the second communication system.

9. A wireless communication apparatus comprising:
a wireless transmitter and receiver antenna (ANT) and
a wireless signal switching circuit for switching a plurality of transmitter and receiver signals having different frequencies in wireless communication for communication by at least a first communication system and a second communication system, the wireless signal switching circuit comprising:
an antenna terminal (11) connected to an antenna (ANT);
a first signal route switching means (20) having a plurality of switch means (21, 23, 24, 60) for selecting a plurality of transmitter and receiver signals having different frequencies in the first communication system, the different frequencies including at least a second frequency and a third frequency (F2, F3);
a phase rotating means (40) having one end (40a) connected to the antenna terminal (11) and imparting a phase rotation of 90 degrees to the phase of the signal of the frequency component supplied to the first signal route switching means (20); and
a second signal route switching means (30) having a diplexer (31) for separating the transmitter and receiver signals having a first frequency (F1) of the second communication system lower than the first and second frequencies (F2, F3) of the first communication system and the transmitter and receiver signals of the first communication system, a common input and output terminal (31a) of the diplexer (31) being connected to the other end (40b) of the phase rotating means, a first filter side terminal (31b) of the diplexer (31) being supplied with transmitter and receiver signals having the first frequency (F1) of the second communication system, and a second filter side terminal (31c) of the diplexer (31) being supplied with transmitter and receiver signals of the second communication system, and
an inductor (41) being connected between the one end (40a) connected to the antenna terminal (11) and the other end (40b) connected to the diplexer (31) in the second routing means (30), and wherein the phase rotating means comprises:
- the inductor (41) having the other end (40b) connected to the common input and output terminal (31a) of the diplexer (31),
- a first capacitor (42) connected between one end of the inductor (41) and a reference potential node,
- a second capacitor (43) connected between the other end of the inductor and the reference potential node,
- a first switch means (44, 60) having one end connected to the other end of the inductor (41), and
- a third capacitor (45) connected between the other end of the first switch means (44, 60) and the reference potential node, and has the characteristics

- that a circuit defined by the inductor (41) and the first to third capacitors (42, 43, 45) imparts a phase rotation of 90 degrees to the phase of the signal of the frequency component supplied to the first signal route switching means (20) when the first switch means is activated and
- that a circuit defined by the inductor (41) and the first and second capacitors (42, 43) attenuates the harmonic component of the signal transmitted by the second communication system when the first switch means is de-activated.

10. A wireless communication apparatus as set forth in claim 9, wherein:
the wireless communication apparatus is a mobile wireless communication apparatus including a dual mode compatible mobile phone of a triple band GSM system as the first communication system and a UMTS system as the second communication system.

11. A wireless communication apparatus as set forth in claim 9, wherein:
the second filter side terminal of the diplexer is connected to a front end of a UMTS use transmission and reception circuit, and
the front end has:
- a duplexer (561) for switching the UMTS transmitter signal and UMTS receiver signal,
- a low noise amplifier circuit (562) for amplifying the UMTS receiver signal input through this duplexer, and
- a power amplifier circuit (563) for amplifying the UMTS transmitter signal.

12. A wireless communication apparatus as set forth in claim 9, wherein
the phase rotating means has a characteristic of attenuating harmonic components of signals transmitted by the second communication system.

13. A wireless communication apparatus as set forth in claim 9, wherein
the first filter side of the diplexer (31) is a low frequency filter side, and the second filter side of the diplexer (31) is a high frequency filter side.

14. A wireless communication apparatus as set forth in claim 9, wherein
the first communication system is a triple band GSM system, and
the second communication system is a UMTS system.

15. A wireless communication apparatus as set forth in claim 14, wherein the first signal route switching means (20) comprises:
- a first receiver signal switching circuit connected to the antenna terminal (11) and having a plurality of switch means (23, 24) for selecting receiver signals (F2RX or F3RX) having a the different frequencies including at least the second frequency and the third frequency (F2, F3) in the first communication system and
- a first transmitter signal switching circuit connected to the antenna terminal (11) and having a switch means (22) for selecting transmitter signals (F2 or F3TX) having the different frequencies including at least the second frequency and the third frequency (F2, F3) in the first communication system and a filter means connected to the switch means.

16. A wireless communication apparatus as set forth in claim 15, wherein the wireless communication apparatus is a mobile wireless communication apparatus including a dual mode compatible mobile phone of the triple band GSM system as the first communication system and the UMTS system as the second communication system.

17. A wireless communication apparatus as set forth in claim 9, wherein the second signal route switching means (30) has a switch means (32) connected to the first filter side terminal (31b) of the diplexer (31) and selecting a transmitter signal having a further different frequency (F1) of the first communication system and a switch means (33) for selecting a receiver signal having the first frequency (F1) of the second communication system.

18. A wireless communication apparatus as set forth in claim 17, wherein the wireless communication apparatus is a mobile wireless communication apparatus including a dual mode compatible mobile phone of a triple band GSM system as the first communication system and a UMTS system as the second communication system.

* * * * *

UNITED STATES PATENT AND TRADEMARK OFFICE
CERTIFICATE OF CORRECTION

PATENT NO. : 7,522,887 B2
APPLICATION NO. : 10/561610
DATED : April 21, 2009
INVENTOR(S) : Hiroaki Nagano et al.

It is certified that error appears in the above-identified patent and that said Letters Patent is hereby corrected as shown below:

Abstract, Line 14:
"F3is" should read -- F3 is --.

Column 13, Line 61:
"a the" should read -- the --.

Column 16, Line 17:
"a the" should read -- the --.

Signed and Sealed this

Twenty-first Day of July, 2009

JOHN DOLL
*Acting Director of the United States Patent and Trademark Office*